US009985962B2

(12) United States Patent
Nishida

(10) Patent No.: US 9,985,962 B2
(45) Date of Patent: May 29, 2018

(54) AUTHORIZATION SERVER, AUTHENTICATION COOPERATION SYSTEM, AND STORAGE MEDIUM STORING PROGRAM

(71) Applicant: CANON KABUSHIKI KAISHA, Tokyo (JP)

(72) Inventor: Takahiko Nishida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/364,916

(22) Filed: Nov. 30, 2016

(65) Prior Publication Data

US 2017/0163636 A1    Jun. 8, 2017

(30) Foreign Application Priority Data

Dec. 8, 2015    (JP) ................................ 2015-239750

(51) Int. Cl.
| | |
|---|---|
| *H04L 29/06* | (2006.01) |
| *H04L 9/32* | (2006.01) |
| *G06F 21/44* | (2013.01) |
| *H04W 12/06* | (2009.01) |
| *G06Q 20/36* | (2012.01) |

(52) U.S. Cl.
CPC ........ *H04L 63/0853* (2013.01); *G06F 21/445* (2013.01); *G06Q 20/3674* (2013.01); *H04L 9/32* (2013.01); *H04L 63/083* (2013.01); *H04L 63/0807* (2013.01); *H04L 63/10* (2013.01); *H04W 12/06* (2013.01)

(58) Field of Classification Search
CPC ... H04L 63/0853; H04L 63/083; H04L 63/10; H04L 63/0807; H04L 9/32; H04W 12/06; G06F 21/445; G06Q 20/3674
See application file for complete search history.

(56) References Cited

U.S. PATENT DOCUMENTS

| | | | |
|---|---|---|---|
| 6,510,236 B1 | 1/2003 | Crane | |
| 7,685,206 B1 * | 3/2010 | Mathew | ................ H04L 63/105 707/785 |
| 8,010,783 B1 | 8/2011 | Cahill | |
| 8,739,260 B1 | 5/2014 | Damm-Goossens | |
| 9,106,642 B1 | 8/2015 | Bhimanaik | |
| 9,420,463 B2 * | 8/2016 | Mihaylov | ........... H04L 63/0807 |
| 2005/0154913 A1 | 7/2005 | Barriga et al. | |
| 2005/0228981 A1 * | 10/2005 | Gavrilov | ................. H04L 63/08 713/100 |
| 2006/0015358 A1 | 1/2006 | Chua | |
| 2007/0289002 A1 | 12/2007 | van der Horst et al. | |

(Continued)

FOREIGN PATENT DOCUMENTS

| | | |
|---|---|---|
| EP | 2713300 A1 | 4/2014 |
| JP | 2015-518198 A | 6/2015 |

*Primary Examiner* — Michael Pyzocha
(74) *Attorney, Agent, or Firm* — Canon USA Inc. IP Division

(57) ABSTRACT

An authorization token verification request including a second authorization token is received from an application server having received a processing request along with the second authorization token from a client device, and, in a case where the authorization token is verified successfully on basis of the received second authorization token and the authorization token information, the local user information included in the authorization token information is responded to the application server.

7 Claims, 11 Drawing Sheets

(56) References Cited

U.S. PATENT DOCUMENTS

| | | |
|---|---|---|
| 2008/0183628 A1 | 7/2008 | Oliver et al. |
| 2009/0222900 A1 | 9/2009 | Benaloh et al. |
| 2009/0271847 A1 | 10/2009 | Karjala et al. |
| 2010/0235882 A1 | 9/2010 | Moore |
| 2013/0019297 A1 | 1/2013 | Lawson et al. |
| 2013/0125223 A1 | 5/2013 | Sorotokin et al. |
| 2013/0318592 A1 | 11/2013 | Grier, Sr. et al. |
| 2014/0044123 A1 | 2/2014 | Lawson et al. |
| 2014/0082366 A1* | 3/2014 | Engler ............... H04L 9/3226 713/176 |
| 2014/0189808 A1 | 7/2014 | Mahaffey et al. |
| 2014/0245411 A1 | 8/2014 | Meng et al. |
| 2014/0373103 A1 | 12/2014 | Hirata |
| 2015/0032627 A1 | 1/2015 | Dill et al. |
| 2015/0033315 A1* | 1/2015 | Gadamsetty ........ H04L 63/0815 726/8 |
| 2015/0046338 A1 | 2/2015 | Laxminarayanan et al. |
| 2015/0180863 A1* | 6/2015 | Kobayashi ............. H04L 47/70 726/9 |
| 2015/0254672 A1 | 9/2015 | Huesch et al. |
| 2015/0281225 A1 | 10/2015 | Schoen et al. |
| 2015/0365399 A1 | 12/2015 | Biswas et al. |
| 2016/0063657 A1 | 3/2016 | Chen et al. |
| 2016/0119306 A1* | 4/2016 | Matthews ............... H04L 63/08 726/6 |
| 2016/0134660 A1* | 5/2016 | Ponsini .................. H04L 63/20 726/1 |
| 2016/0156700 A1* | 6/2016 | Chen .................... H04L 67/10 726/3 |
| 2016/0164878 A1* | 6/2016 | Nakano ............... H04L 67/1097 726/4 |
| 2016/0269388 A1* | 9/2016 | Ezell .................... H04L 41/18 |
| 2017/0034172 A1* | 2/2017 | Biggs .................... H04L 63/08 |

* cited by examiner

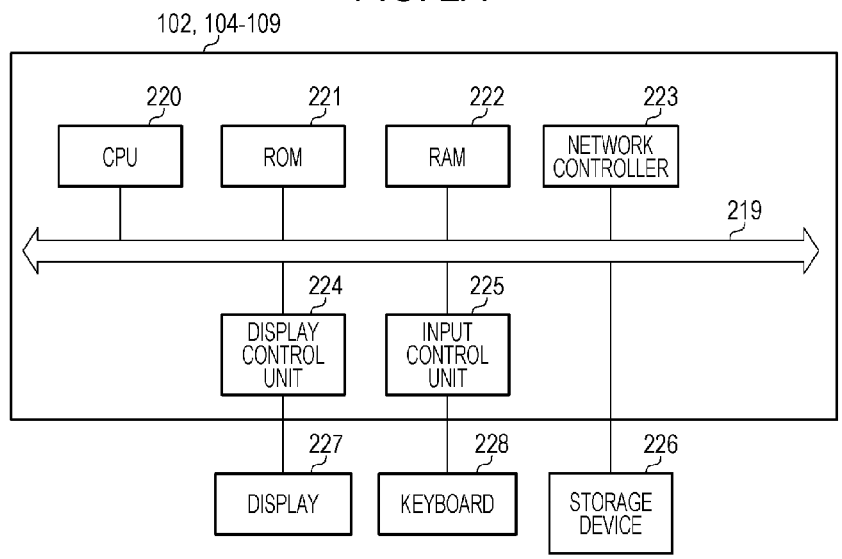
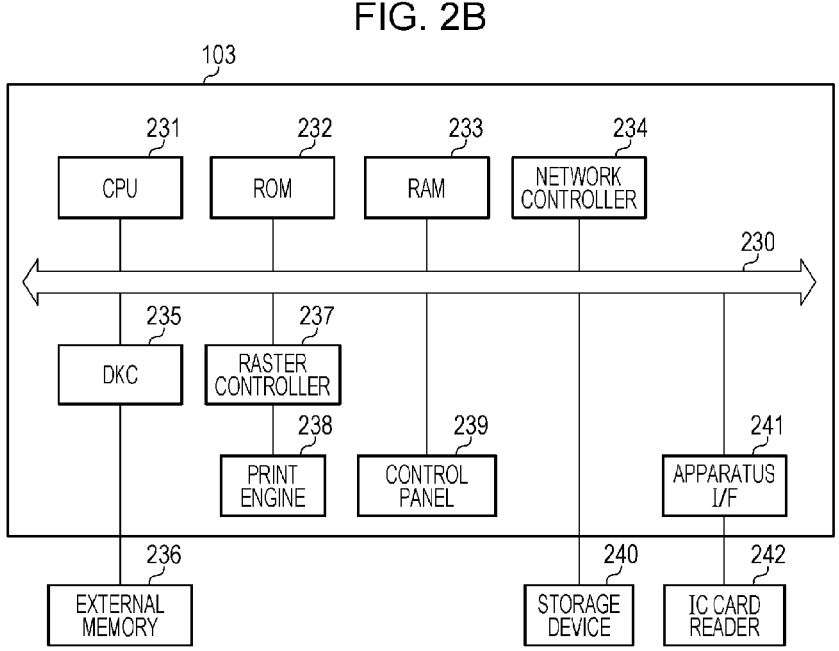

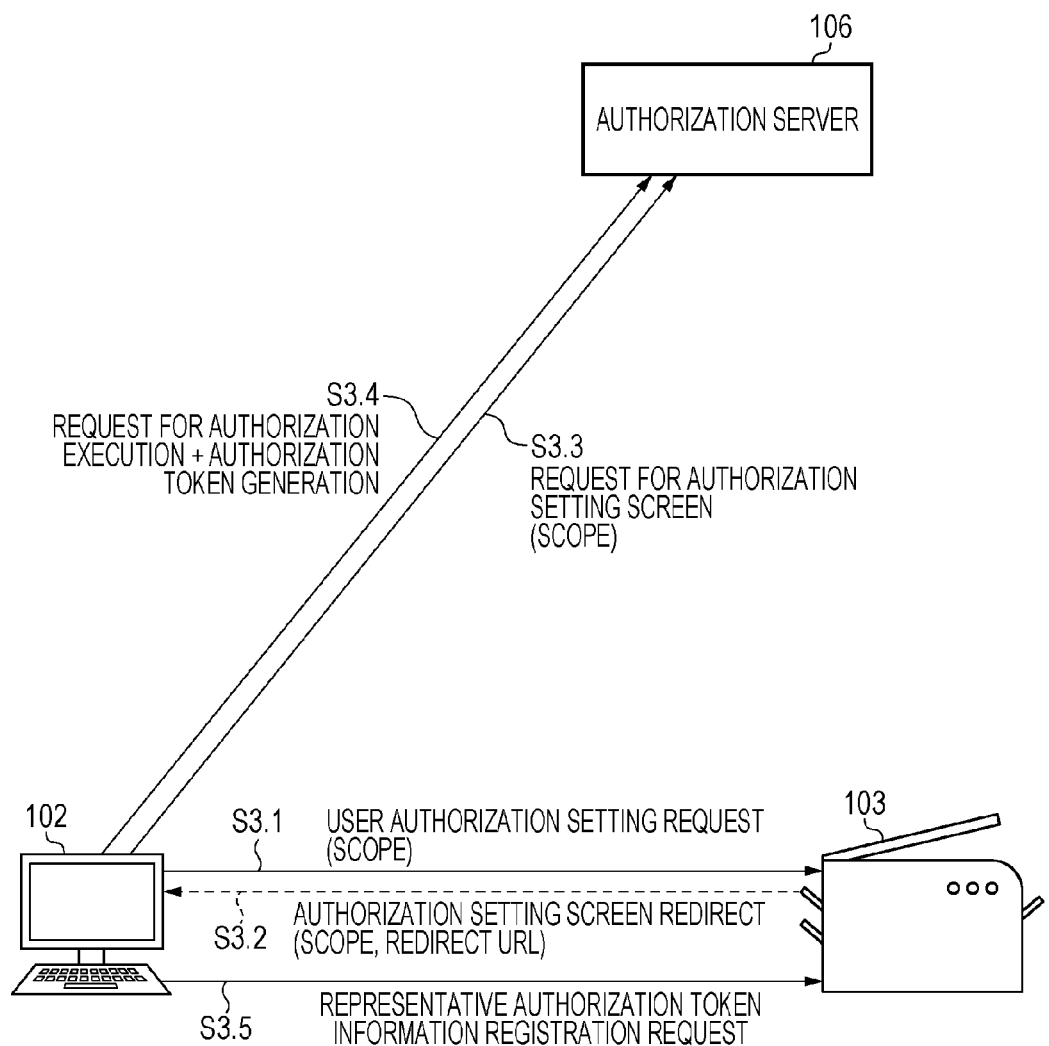

FIG. 4A

LOG-IN SCREEN

TENANT ID  user_tenant1  ~901
CLIENT ID  client0001    ~902
PASSWORD  ****           ~903
           LOG IN        ~904

FIG. 4B

AUTHORIZATION CONFIRMATION SCREEN (i) IS IT OK TO AUTHORIZE?

CLIENT ID TO BE USED: client0001
TENANT ID: user_tenant1
PRINTER IP TO BE AUTHORIZED: 192.168.0.11

ACCESS TO BE PERMITTED: EXECUTION OF
PRINTING IN BUSINESS FORM SERVICE

| DOMAIN NAME (301) | USER NAME (302) | PASSWORD (303) |
|---|---|---|
| localserver1.net | user1 | ****** |
| localserver1.net | user2 | ******* |
| localserver2.net | user1 | ***** |
| localserver2.net | user2 | ********* |
| localserver2.net | user3 | ******** |

| AUTHORIZATION TOKEN (401) | CLIENT ID (402) | TENANT ID (403) |
|---|---|---|
| AT_000000 | client0001 | user_tenant1 |

| AUTHORIZATION TOKEN (421) | USER NAME (422) | DOMAIN NAME (423) |
|---|---|---|
| AT_000001 | user2 | localserver2.net |

| CLIENT ID (501) | SECRET (502) | SCOPE (503) | TENANT ID (504) |
|---|---|---|---|
| client0001 | ********* | Print | user_tenant1 |
| client0002 | ********* | Print | user_tenant2 |
| client0003 | ********* | Print | user_tenant3 |

| AUTHORIZATION TOKEN (511) | EXPIRATION DATE (512) | SCOPE (513) | CLIENT ID (514) | TENANT ID (515) | APPLICATION ID (516) |
|---|---|---|---|---|---|
| AT_000000 | 09/30/2015 11:00.00 | Print | client0001 | user_tenant1 | – |
| AT_000001 | 12/30/2015 12:00.00 | Print | client0001 | user_tenant1 | user2@localserver1.net |
| AT_000002 | 12/30/2015 13:00.00 | Print | client0003 | user_tenant3 | userA@yyyy.net |
| AT_000003 | 09/30/2015 13:00.00 | Print | client0002 | user_tenant2 | userB@xxxx.net |
| AT_000004 | 10/11/2015 00:40.00 | Print | client0001 | user_tenant1 | user1@localserver1.net |

FIG. 10A

| DOCUMENT ID | TENANT ID | USER ID | DOCUMENT URL |
|---|---|---|---|
| 0VcaQB3CTeqfRgjRTgXnGw | user_tenant1 | 45787890-34e4-32a4-8921-446655440000 | https://storage.com/user_tenant1/45787890-34e4-32a4-8921-446655440000/documents/0VcaQB3CTeqfRgjRTgXnGw |
| 2dxQMbL9QX6aE.VdQEoOcg | user_tenant1 | 14290453-1ee2-33a5-5647-890771346112 | https://storage.com/user_tenant1/14290453-1ee2-33a5-5647-890771346112/documents/2dxQMbL9QX6aE.VdQEoOcg |
| 6ENvR69LQBC0gNRIQDbWrA | user_tenant2 | 33677112-6c5b-8d71-3452-128923434545 | https://storage.com/user_tenant2/33677112-6c5b-8d71-3452-128923434545/documents/6ENvR69LQBC0gNRIQDbWrA |
| EvfIEOj6RuKv20wzxg-0YA | user_tenant3 | 76541823-5d6c-7789-1147-564252345234 | https://storage.com/user_tenant3/76541823-5d6c-7789-1147-564252345234/documents/EvfIEOj6RuKv20wzxg-0YA |

FIG. 10B

| DATA CONVERSION ID | TENANT ID | USER ID | PRINT URL | STATUS |
|---|---|---|---|---|
| e31aafc9-7a6f-4f9f-9b4d-f3754bc08103 | user_tenant1 | 45787890-34e4-32a4-8921-446655440000 | https://storage.com/user_tenant1/ff169537-acd7-46f5-9cd6-73df860334f4/printjobs/e31aafc9-7a6f-4f9f-9b4d-f3754bc08103 | CONVERTED |
| 994689f0-b088-4784-9d76-0e247ce7a11f | user_tenant1 | 14290453-1ee2-33a5-5647-890771346112 | https://storage.com/user_tenant1/14290453-1ee2-33a5-5647-890771346112/printjobs/994689f0-b088-4784-9d76-0e247ce7a11f | CONVERTED |
| e322ee00-c74e-4225-b434-6291dc5deb2d | user_tenant2 | 33677112-6c5b-8d71-3452-128923434545 | https://storage.com/user_tenant2/33677112-6c5b-8d71-3452-128923434545/printjobs/e322ee00-c74e-4225-b434-6291dc5deb2d | STANDBY |
| 3abc2649-bc08-49aa-b565-695b1c39888f | user_tenant3 | 76541823-5d6c-7789-1147-564252345234 | https://storage.com/user_tenant3/76541823-5d6c-7789-1147-564252345234/printjobs/3abc2649-bc08-49aa-b565-695b1d39888f | STANDBY |

FIG. 10C

| TENANT ID | LOCAL AUTHENTICATION COOPERATION MODE |
|---|---|
| user_tenant1 | true |
| user_tenant2 | false |
| user_tenant3 | true |

| DATA URL | FILE PATH |
|---|---|
| https://storage.com/user_tenant1/45787890-34e4-32a4-8921-44655440000/documents/0VcaQB3CTeqfRgjRTgXnGw | /user_tenant1/45787890-34e4-32a4-8921-44655440000/documents/0VcaQB3CTeqfRgjRTgXnGw |
| https://storage.com/user_tenant1/14290453-1ee2-33a5-5647-89077134611 2/documents/2dxQMbL9QX6aE.VdQEoOcg | /user_tenant1/14290453-1ee2-33a5-5647-89077134611 2/documents/2dxQMbL9QX6aE.VdQEoOcg |
| https://storage.com/user_tenant1/ff169537-acd7-46f5-9cd6-73df860334f4/printjobs/e31aafc9-7a6f-4f9f-9b4d-f3754bc08103 | /user_tenant1/ff169537-acd7-46f5-9cd6-73df860334f4/printjobs/e31aafc9-7a6f-4f9f-9b4d-f3754bc08103 |
| https://storage.com/user_tenant1/14290453-1ee2-33a5-5647-890771346112/printjobs/99468 9f0-b088-4784-9d76-0e247ce7a11f | /user_tenant1/14290453-1ee2-33a5-5647-890771346112/printjobs/99468 8f0-b088-4784-9d76-0e247ce7a11f |

801  802

AUTHORIZATION SERVER, AUTHENTICATION COOPERATION SYSTEM, AND STORAGE MEDIUM STORING PROGRAM

BACKGROUND OF THE INVENTION

Field of the Invention

The present invention relates to an authorization server, an authentication cooperation system between a service of cloud services, for example, and a local service, and a storage medium storing a program.

Description of the Related Art

In recent years, cloud computing services (or cloud services) which make a server open to the Internet to provide services to a client have gathered attentions. Fundamentally, a cloud computing service may distribute and execute data conversion and data processing by using many computing resources and process requests from many clients in parallel by performing distributed parallel processing. Presently, there are so many venders each of which implements a Web service on a cloud computing service environment for realizing a cloud computing service as described above, resulting in a wide variety of services provided on the Web. In developing a cloud service, many services which have already been provided on the web may be effectively used to provide a new function so that advantages can be gained in terms of development speed and development costs. On the other hand, in the past, a carrier, for example, may possess its own servers and so on and operate many ON-premise systems. Transferring all internal systems to a cloud service together may be difficult. Hence, partial ON-premise systems may be transferred to a cloud service in a stepwise manner. As a result, an increased number of users may utilize both of an ON-premise service and a cloud service in cooperation with each other.

When an ON-premise service and a cloud service in cooperation are used, Single Sign On (hereinafter, also called SSO) has been demanded strongly because a local authentication (such as LDAP) as in a conventional ON-premise system and a cloud authentication are different. According to a conventional technology, a local authentication of an ON-premise system may be synchronized with a local authentication service constructed in a cloud service so that a login to a login service of both of the cloud service and the ON-premise system can start a user ID provisioning. This, for example, may start management including generation and maintenance of information regarding a user account such as a user ID. After that, when a user uses a VPN to log in to the local authentication service for the cloud service, the user can log in to the cloud service with credential information associated with the user. See PCT Japanese Translation Patent Publication No. 2015-518198.

SUMMARY OF THE INVENTION

ID provisioning for all users may be required for cooperation between a local authentication and a cloud service authentication. Because maintenance of the ID provisioning is required every time the number of users increases or decreases, the operational costs for the user management may be increased disadvantageously.

The present invention was made in view of the conventional examples as described above, and aspects of the present invention provide an authorization server, an authentication cooperation system, and a storage medium storing a program, which can eliminate necessity for user-ID provisioning between a local authentication and a cloud service authentication.

The present invention can also reduce operational loads because ID provisioning between a local authentication and a cloud service authentication is not necessary.

The present invention has the following configurations.

A first aspect of the present invention provides an authorization server including a unit configured to receive an authorization token generation request along with representative authorization token information and local user information from a client device, the client device receiving transfer of an authority for using an application server based on an authorization operation performed by a user, the client device registering a first authorization token issued based on the transfer as representative authorization token information, a unit configured to, in a case where a client device is authenticated successfully on the basis of the representative authorization token information received along with an authorization token generation request, respond a second authorization token to the client device and generate and store authorization token information by associating the local user information received along with the authorization token generation request with the second authorization token, and a responding unit configured to receive an authorization token verification request including the second authorization token from an application server that received a processing request along with the second authorization token from the client device, and, in the case that the authorization token is verified successfully on the basis of the received second authorization token and the authorization token information, respond with the local user information included in the authorization token information to the application server.

A second aspect of the present invention provides an authentication cooperation system including an authorization server, an application server, and a client device, wherein the client device includes a storing unit configured to store a first authorization token as representative authorization token information, the first token being issued based on transfer of an authorization for using the application server based on an authorization operation performed by a user, a transmitting unit configured to transmit an authorization token generation request along with local user information of a log-in user and the representative authorization token information to the authorization server, and wherein, in the case that a second authorization token is received along with the authorization token generation request, the transmitting unit is configured to transmit a request for processing along with the second authorization token to the application server, and wherein the application server includes a transmitting unit configured to transmit the authorization token verification request to the authorization server when the application server receives a processing request along with the second authorization token from the client device and receive the authorization token information including the local user information associated with the second authorization token as a response as a result of a success of the authorization token verification request, and a processing unit configured to process the processing request for a user described in the local user information or for the client device.

Further features of the present invention will become apparent from the following description of embodiments with reference to the attached drawings.

BRIEF DESCRIPTION OF THE DRAWINGS

FIGS. 2A and 2B are hardware configuration diagram of apparatuses.

FIG. 3 illustrates a printer authorization flow.

FIGS. 4A and 4B illustrate user authorization screens.

FIG. 9A illustrates a table structure managed in a local authentication server, FIGS. 9B and 9C illustrate table structures managed in a printer, and FIGS. 9D and 9E illustrate table structures managed in an authorization server.

FIGS. 10A to 10C illustrate table structures managed in a data conversion server.

FIG. 11 illustrates a table structure managed in a storage server.

DESCRIPTION OF THE EMBODIMENTS

Embodiments of the present invention will be described below with reference to drawings.

First Embodiment

System Configuration

Figure 1:
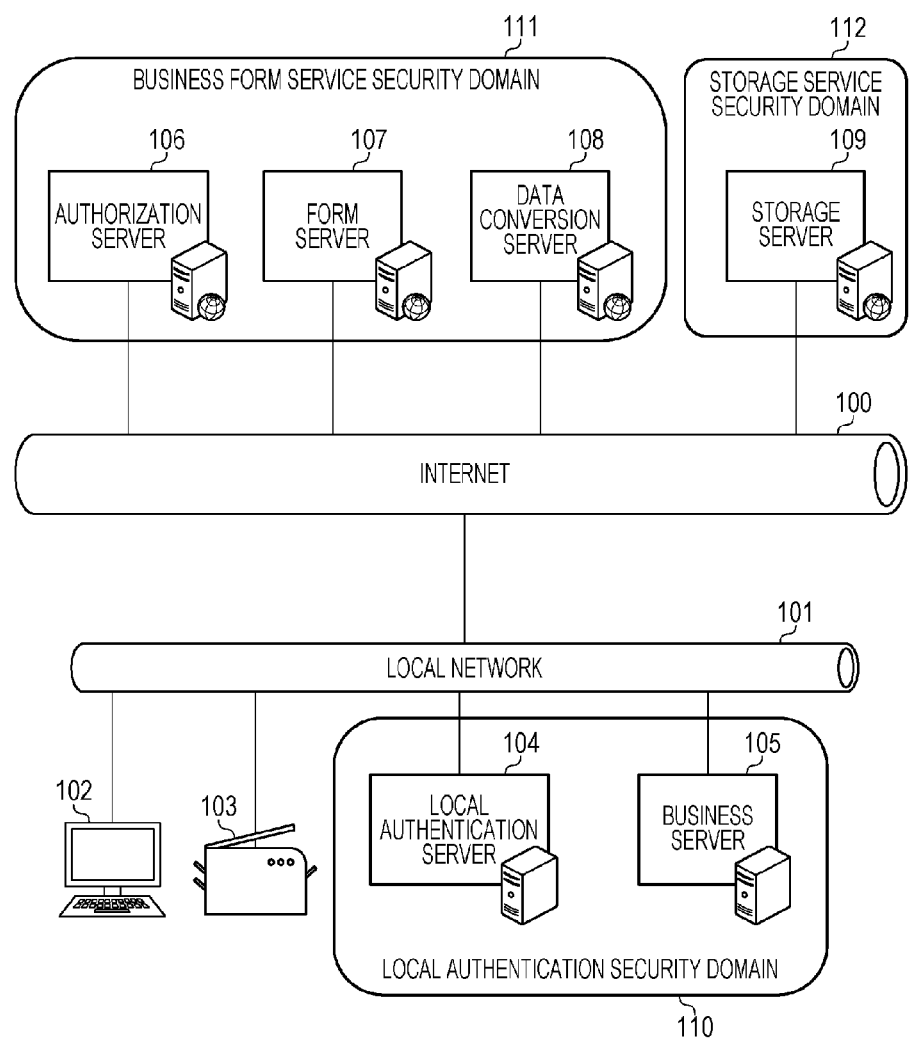
FIG. 1 is a system configuration diagram.

FIG. 1 illustrates an overall configuration of a mobile printing system including an authentication cooperation system according to an embodiment of the present invention.

Referring to FIG. 1, one or a plurality of mobile terminals 102 is connected to a local network 101. The mobile terminal 102 is capable of accessing the internet 100 through the local network 101 to access servers 104 to 109. The mobile terminal 102 is connected to the network through a wired or wireless LAN.

Each of security domains 110 to 112 indicates a user accessible, authenticated and authorized range, and an authenticated and authorized user or an authorization token is not allowed to be used beyond such a security domain. A local authentication security domain 110 indicates a user accessible range authenticated by the local authentication server 104, and a business server 105 belongs to the local authentication security domain 110. A business form service security domain 111 indicates a range accessible by using an authorization token issued by an authorization server 106, and a form server 107 and a data conversion server 108 belong to the business form service security domain 111. A storage service security domain 112 indicates a range accessible by using an authorization token issued by a storage service security domain authorization server, not illustrated, and a storage server 109 belongs to the storage service security domain 112. Referring to FIG. 1, the local authentication security domain 110 corresponds to an ON-premise system, and the business form service security domain 111 and storage service security domain 112 correspond to a cloud system.

The local authentication server 104 is a server for execution of user authentication for an access to the business server 105. A user is allowed to access the business server 105 if he or she is authenticated by the local authentication server 104. LDAP may often be used as a local authentication method, but a simple authentication method only including confirmation of matching of a user name, a password, and a domain may be used according to this embodiment. However, this is given for illustration purpose only. The invention according to this embodiment is also applicable to another authentication method in which user authentication is performed by using unique authentication information of a user.

The business server 105 is a server configured to manage user work information. This embodiment assumes a use case where products for sale are managed client by client in the business server 105 so that the information in the business server 105 may be used by a salesperson for sales work. The business server 105 provides screens for displaying and editing user work information in response to a request from the mobile terminal 102. The authorization server 106 is a server for implementing OAuth (the open standard for authorization) and is configured to manage client information and issue and manage an authorization token. The form server 107 is a server configured to receive user work information from the business server 105 and manages a business form PDF generated by reflecting the user work information to a form template. The form server 107 requests the data conversion server 108 to store the generated business form PDF. The data conversion server 108 receives the request for the business form PDF storage from the form server 107 and stores and manages the business form PDF data and receives a print data conversion request from a printer 103 and generates and manages print data. The storage server 109 is a server configured to perform file management and receive files uploaded or downloaded from the printer 103, the mobile terminal 102, the form server 107, and the data conversion server 108. OAuth is a mechanism for safely receiving and transmitting (or transferring) a user authority under an agreement of the user as a precondition, and the authorization server 106 is a server realizing the mechanism. According to OAuth, for example, all or a part of a user's rights authorized by a first server are transferred to a second server so that the second server can receive a service provided by the first server within the range or scope of the transferred user's rights. According to OAuth, a user is not required to inform the second server of his or her authentication information for logging in to the first server.

Servers including the servers 106 to 109 are open to the Internet as those providing cloud services. Each of them is illustrated as one server here for simple illustration of this embodiment, but may comprise a plurality of servers. The local authentication server 104 and the business server 105 are illustrated as one server for simple illustration of this embodiment, but also may comprise a plurality of servers. Among servers providing cloud services, servers providing applications to clients, excluding the authorization server 106 and the storage server 109, may sometimes be called collectively as an application server.

According to this embodiment, a method will be described by which the printer 103 prints a business form PDF stored in the data conversion server 108. The data in the business server 105 is used to generate a business form PDF in the form server 107, and it is assumed here that the business form PDF has been stored already from the form server 107 to the data conversion server 108.

Hardware Configuration of Client Terminal 102 and Servers 104 to 109

FIG. 2A illustrates an example hardware configuration of the client terminal 102 and each of the servers 104 to 109. The present invention according to this embodiment is applicable to either a single apparatus or a system including a plurality of apparatuses if functionality of the invention according to this embodiment is executable unless otherwise specified. The present invention according to this embodiment is also applicable to a system including apparatuses connected over a network such as a LAN or a WAN for performing processing functionality of the invention of this embodiment unless otherwise specified. This embodiment will be described by assuming that the components are connected through a system bus 219.

A CPU 220 is a control device for an image processing apparatus and is configured to execute an application program, a print driver program, an operating system, and a printing system program according to this embodiment, which are stored in the storage device 226. The CPU 220 controls to temporarily store in the RAM 222 information and files, for example, required for program execution. The CPU 220 may open various registered windows in response to a command given by using, for example, a mouse cursor, not illustrated, on the display 227 and execute various kinds of data processing. A ROM 221 is a ROM configured to store fixed information and internally store programs such as a basic I/O program and font data, template data, and other various kinds of data usable for document processing. A RAM 222 is a RAM configured to temporarily store information and functions as a main memory and a work area for the CPU 220. A display control unit 224 is configured to control information output on a display 227. An input control unit 225 is configured to control information input through a keyboard 228, and an image processing apparatus can exchange data with an external apparatus through the input control unit 225. A storage device 226 is one of external storages, functions as a large volume memory and stores an application program, a print driver program, an OS and so on. The keyboard 228 is an instruction input unit usable by a user to input an instruction to a server. The display 227 is a display unit configured to display a command input through the keyboard 228, for example. A network controller 223 is a network interface unit configured to connect to the Internet directly or indirectly.

The client terminal 102 may be a desktop PC, a laptop PC, a mobile PC, a PDA (personal data assistant), for example, and may be built in an environment where a program such as a Web browser is executed. A Web browser installed in the client terminal 102 is stored in the storage device 226 illustrated in FIG. 2A and is loaded to and executed in the RAM 222 by the CPU 220, as described above.

Hardware Configuration of Printer 103

FIG. 2B is a hardware configuration diagram of the printer 103. The hardware components therein are connected to a system bus 230. A CPU 231 controls the apparatus overall and generally controls accesses to devices connected to the system bus 230. This control may be based on a control program stored in the ROM 232 or a control program and resource data (resource information) stored in an external memory 236 connected through a disk controller (DKC 235). The RAM 233 is a RAM configured to function as a main memory and a work area for the CPU 231 and has a memory size extensible by using an optional RAM connected to an extension port, not illustrated. A storage device 240 is an external storage apparatus configured to function as a large-capacity memory. A control panel (operating unit) 239 is configured to display a screen and receive a user's operating instructions through such a screen. Buttons and a display unit such as a liquid crystal panel are further provided for performing operations including setting an operation mode of the printer 103, displaying an operating status of the printer 103, and designating content data to be printed. A network controller 234 is a network interface card (NIC) and enables the exchange of data with an external apparatus through the interface 234. In this case, a print engine 238 illustrated in FIG. 2B applies a known print technology and may be based on, for example, electrophotography (laser beam method), an ink-jet method, or a dye-sublimation (thermal transfer) method. A raster controller 237 is a controller configured to convert print data in PDL language to image data. An apparatus I/F 241 is a connection interface to an external apparatus connectable to the apparatus via a USB. According to this embodiment, an IC card reader 242 is connected to the apparatus I/F 241 and may enable user information, for example, contained in an IC card to be read in a non-contact manner so that an application program running on the printer 103 can use the read information.

Software Configuration of Local Authentication Server 104

Next, software configurations of the servers and printer illustrated in FIG. 1 necessary for implementing this embodiment will be described with regard to management information handled by them. The local authentication server 104 includes an authentication I/F 1041, an authentication information management unit 1042, and a storage configured to store local authentication information 300. The software modules are stored in the storage device 226 illustrated in FIG. 2A and are loaded to and executed in the RAM 222 by the CPU 220, as described above. The authentication I/F 1041 provides an interface to the local authentication server 104 and verifies validity of received information. The authentication information management unit 1042 manages the local authentication information 300 illustrated in FIGS. 9A to 9E and responds the success or failure of the user authentication in response to a request received by the authentication I/F 1041. The local authentication information 300 illustrated in FIGS. 9A to 9E are data tables stored in an external memory by the local authentication server 104. Such a data table may be stored in another server communicatively connected to the Internet 100 or a local network 101 instead of the storage in the local authentication server 104. The data tables held by the local authentication server 104 include the local authentication information 300. The local authentication information 300 includes a domain name (domain identification information) 301, a user name (user identification information) 302, and a password 303 as user information of a user allowed to access the business server 105. The local authentication server 104 authenticates a user if user authentication information input by the user subject to a local authentication is matched to user authentication information registered as the local authentication information 300. The local authentication information 300 can be used locally within the local authentication security domain 110.

Software Configuration of Printer

The printer 103 includes a log-in application 1031, an authorization server cooperation client 1032, and a pull-print application 1033. The software modules are stored in the storage device 240 illustrated in FIG. 2B and are loaded to and executed in the RAM 233 by the CPU 231. Hereinafter, the term "application" is abbreviated to "app".

The log-in app 1031 cooperates with the local authentication server 104 to authenticate in the local security domain 110. The log-in app 1031 receives user authentication information (also called user information) of a user who attempts to log in through the IC card reader 242. The log-in app 1031 requests the local authentication server 104 to verify the validity of the user information, that is, to perform user authentication. If the log-in app 1031 receives a response that the user information has been verified successfully, that is, the user has been authenticated successfully from the local authentication server 104, the log-in app 1031 passes the user information of the logging-in user to the pull-print app 1033.

The authorization server cooperation client 1032 uses an OAuth mechanism to cooperate with the authorization server 106 and transfer the authority in the business form service security domain 111 to the printer 103. According to this embodiment, the authorization server cooperation client 1032 holds and manages representative authorization token information 400 and authorization server information 410. FIG. 9B illustrates example representative authorization token information. The authorization server information 410 is information based on which the authorization server cooperation client 1032 can identify the authorization server 106 and may be a URL of the authorization server 106, for example. The authorization server information 410 may be set by a user, for example, in the authorization server cooperation client 1032.

The pull-print app 1033 is configured to transmit a request regarding authenticated printing to the data conversion server 108, acquire print data from the storage server 109, transfer print data to the print engine 238, and execute printing thereon. The pull-print app 1033 holds and manages representative authorization token information 420 and local authentication cooperation information 430. The local authentication cooperation information 430 is held by the pull-print app 1033 in advance and exhibits true/false indicating whether cooperation with the local authentication security domain 110 is enabled or not. FIG. 9B illustrates examples of the representative authorization token information 400 held in the authorization server cooperation client 1032. The representative authorization token information 400 is information regarding an authorization token which is issued by a client registered with the client information 500 in the authorization server 106 and which is associated with a representative client of a client tenant. An authorization token ID 401 is an identifier by which an authorization token is uniquely identifiable. A client ID 402 and a tenant ID 403 are a client ID and a tenant ID, respectively, of a client managed in the client information 500 in the authorization server 106 upon issuance of the authorization token.

The authorization server cooperation client 1032 may use the representative authorization token information 400 to request the authorization server 106 to issue an authorization token. According to this embodiment, in a user authorization setting flow, which will be described below, authorization token information issued in response to an authorization token generation request from a representative client having a client ID of client0001 of a client tenant having a tenant ID of user_tenant1 is registered as the representative authorization token information 400.

FIG. 9C illustrates examples of representative authorization token information 420 which is managed by the pull-print app and which is to be added to a request to the data conversion server 108.

In an authenticated printing flow, in response to a request from the pull-print app 1033, the authorization server cooperation client 1032 uses the representative authorization token information 400 to transmit an authorization token generation request to the authorization server 106. The representative authorization token information 420 is information in which an authorization token issued in response to the authorization token generation request is associated with a user of the local authentication security domain 110. In other words, in the information, a client of a cloud service and a user of the local service are associated. Referring to FIG. 9C, an authorization token ID 421 is an identifier by which an authorization token is uniquely identifiable. A user name 422 and a domain name 423 are user identification information and domain identification information managed by the local authentication server 105 and included in the local authentication information 300 received by the pull-print app 1033 from the log-in app 1031 through an IC card authentication. The pull-print app 1033 holds an authorization token acquired from the authorization server cooperation client 1032 and user information of a log-in user received from the log-in app 1031 by associating them through the representative authorization token information 420.

Software Configuration of Authorization Server 106

The authorization server 106 has a Web server 1061, an authorization information management unit 1062, and a storage storing client information 500 and authorization token information 510. The software modules are stored in the storage device 226 illustrated in FIG. 2A and are loaded to and executed in the RAM 222 by the CPU 220, as described above. The Web server 1061 provides an interface to the authorization server 106 and verifies validity of received information. The authorization information management unit 1062 manages the client information 500 and the authorization token information 510 and may issue an authorization token and check a scope and an effective expiration date in response to a request received from the Web server 1061.

FIG. 9D illustrates examples of the client information 500 stored in a database.

The client information 500 includes information regarding a client allowed to access the servers 106 to 108. According to this embodiment, information regarding the printer 103 is registered as a client with the client information 500. A client ID is an identifier by which a client can be uniquely identified. A secret is a password usable for determining validity of a user. The authorization server 106 identifies a client if a pair of a client ID and a password received from the client is matched with a pair of the client ID 501 and the secret 502 in the client information. A scope 503 is an OAuth scope and indicates a range accessible with an authorization token issued by the authorization server 106. The type of scope according to this embodiment is defined as Print. The Print scope is a scope required by the printer 103 to access an interface of the data conversion server 108. A tenant ID 504 is an identifier by which a client tenant is uniquely identified. According to this embodiment, a user having an ID of client0001 is defined and registered as a representative user of a client tenant having a tenant ID of user_tenant1.

FIG. 9E illustrates examples of the authorization token information 510 stored in the database.

The authorization token information 510 is generated when the authorization server 106 receives a request to generate an authorization token. One record is generated in response to one request. The authorization token 511 is an identifier by which an authorization token can be uniquely identified. An expiration date 512 is an expiration date of an authorization token, and a value after a lapse of a predetermined time period from a time when the authorization token generation request is received is registered. The authorization token is invalid after the expiration date. The scope 513 is a scope in which the authorization token 511 can be used, and a scope passed to the authorization server 106 along with the authorization token generation request is registered therewith. A client ID and a tenant ID passed to the authorization server 106 along with the authorization token generation request are registered as the client ID 514 and the tenant ID 515, respectively. An application ID is an identifier by which an application can be identified in a case where a client uses a plurality of applications. The application ID is registered when an application ID is passed to the authorization server 106 along with an authorization token generation request. No application ID is registered if no application ID is passed to the authorization server 106 along with an authorization token generation request. According to this embodiment, local user information (user name 302@domain name 301) is designated for an application ID in an authorization token generation request from the printer 103 to the authorization server 106 and is registered as the application ID 515. Information excluding a user name and a domain name including a password from the local authentication information will be called local user information hereinafter.

Software Configuration of Data Conversion Server 108

The data conversion server 108 has a Web server 1081, a data conversion unit 1082, a data conversion information management unit 1083, and a storage storing document information 700, data conversion information 710, and tenant setting information 720. The software modules are stored in the storage device 226 illustrated in FIG. 2A and are loaded to and executed in the RAM 222 by the CPU 220, as described above. The Web server 1081 provides an interface to the data conversion server 108 and verifies validity of received information. The Web server 1081 transmits an authorization token verification request and an authorization token information acquisition request to the authorization server 106. The data conversion unit 1082 converts a business form PDF managed as document information 700 to print data interpretable by the printer 103 in response to a request from the printer 103. The data conversion information management unit 1083 manages a business form PDF stored in the storage server 109 by the form server 107 as document information 700 and manages print data generated by the data conversion unit 1082 as data conversion information 710. The data conversion information management unit 1083 further manages the tenant setting information 720, and the data conversion unit 1081 generates print data in response to a print data generation request received by the Web server.

FIG. 10A illustrates examples of the document information 700 stored in a database. The document information 700 is generated when the data conversion server 108 receives a business form PDF storage request. One record is generated in response to one request. A document ID 701 is an identifier which is issued when the data conversion server 108 receives a business form PDF storage request and by which a document can be uniquely identified. The tenant ID 702 is a tenant ID of a tenant of a requestor issuing a business form PDF storage request, that is, an identifier by which the tenant is uniquely identified. The user ID 703 is an identifier of a user being a requestor issuing a business form PDF storage request. With the user ID 703, a client ID managed by the authorization server 106 or local user information (user name 302@domain name 301) managed by the local authentication server 104 is registered. A document URL is a URL path in the storage server 109 storing a business form PDF.

FIG. 10B illustrates examples of the data conversion information 710 stored in a database.

The data conversion information 710 is generated when the data conversion server 108 receives a print data generation request. One record is generated in response to one request. A data conversion ID 711 is an identifier which is issued when the data conversion server 108 receives a print data generation request and by which a data conversion process can be uniquely identified. A tenant ID 712 and a user ID 713 exhibit equal values to those of the tenant ID 701 and the user ID 703, respectively, in the document information 700 which is generated when the data conversion server 108 receives a print data generation request and which is to be data-converted. A print URL 714 is a URL of the storage server 109 being a storage destination of print data generated by the data conversion server 108. The data conversion information 710 may further include a document ID field so that it can be associated with the document information 700.

FIG. 10C illustrates examples of the tenant setting information 720 stored in a database. The tenant setting information 720 is setting information for each tenant in the data conversion server 108. A local authentication cooperation mode is held as a setting for the tenant ID 721. The local authentication cooperation mode exhibits true/false indicating whether cooperation with the local authentication security domain 110 is enabled or not. For example, "true" indicates the cooperation is enabled while "false" indicates the cooperation is disabled. The local authentication cooperation mode setting for each tenant included in the tenant setting information 720 may be synchronized with the local authentication cooperation information held by clients in the tenant. For example, when the tenant setting information 720 in the data conversion server 108 is set, it may be distributed to the tenant, the data conversion server 108 may collect the local authentication cooperation information set in the tenant conversely, or both of the operations may be executed to keep the synchronization.

Software Configuration of Storage Server 109

Figure 8:
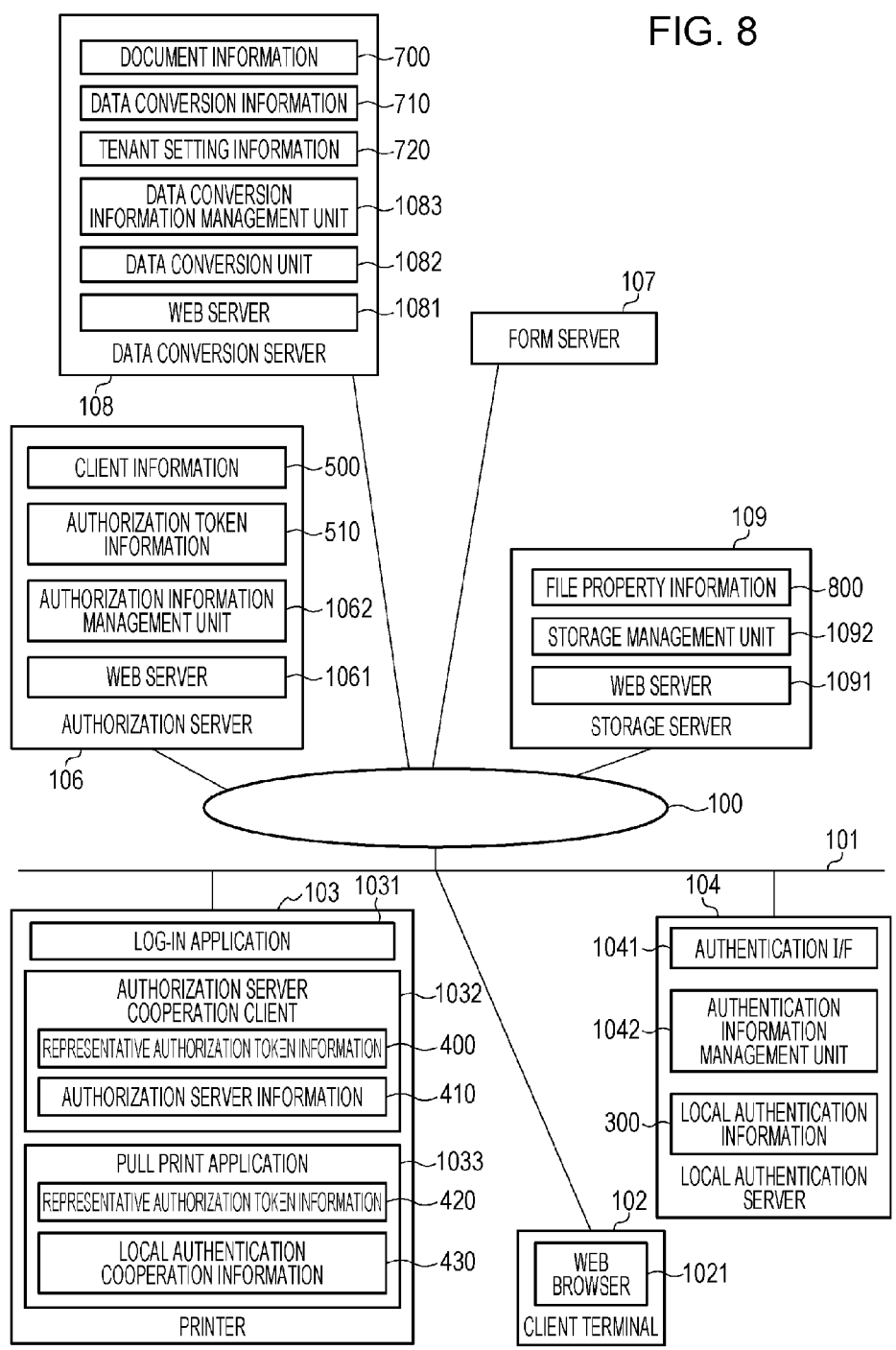
FIG. 8 is a software configuration diagram of apparatuses.

The storage server 109 has a Web server 1091, a storage management unit 1092, and a storage storing file property information 800. The software modules are stored in the storage device 226 illustrated in FIG. 2A and are loaded to and executed in the RAM 222 by the CPU 220, as described above. The Web server 1091 provides an interface to the storage server 109 and verifies validity of received information. The Web server 1091 then transmits an authorization token verification request to a storage authorization server, not illustrated. The storage management unit 1092 manages the file property information 800 illustrated in FIG. 8 and inputs and outputs a file to be requested to upload. The storage stores information held in the storage server 109 illustrated in FIG. 8 and a file received by the storage server 109.

FIG. 11 illustrates examples of the file property information 800 stored in a database.

The file property information 800 is information regarding a file stored in the storage server 109. A data URL is a URL by which a file stored in the storage server 109 can be uniquely identified. A file path is a file path on a storage and indicates a storage location of a file. A request may be issued to the data URL to manipulate the corresponding file in the storage. For example, when an HTTP GET method is requested to the data URL, the corresponding file can be downloaded. When an HTTP PUT method to which a file is attached is requested to the data URL, the file can be uploaded and be stored. When an HTTP DELETE method is requested to the data URL, the corresponding file can be deleted.

User Authorization Setting Flow

FIG. 3 illustrates a flow for authorizing transfer of the authority of a representative user of a client tenant to the printer 103 according to this embodiment.

In S3.1, a Web browser 1021 in the client terminal 102 transmits a user authorization setting request by designating a necessary scope to the printer 103. According to this embodiment, for example, Print that is a necessary scope for the printer 103 to access the interface of the data conversion server 108 is designated as the scope.

In S3.2, when the authorization server cooperation client 1032 in the printer 103 receives the user authorization setting request, the authorization server cooperation client 1032 returns an instruction to redirect to an authorization setting screen to the Web browser 1021. The redirect instruction is an instruction to cause the Web browser 1021 to transmit information regarding the printer 103 and an authorization request including a scope of a necessary authority to the authorization server 106.

In S3.3, the Web browser 1021 according to the received redirect instruction transmits an authorization setting screen request to the authorization server 106.

In S3.4, when the authorization server 106 receives the authorization setting screen request in the Web server, the authorization server 106 determines that a log-in state is not acquired if no authentication information is added to the authorization setting screen request and returns a log-in screen. If the authentication information is added and if it is determined that a log-in state has been acquired already, the authorization server 106 refers to the client information 500 and identifies the log-in user.

FIG. 4A illustrates a log-in screen example received by the Web browser 1021 from the authorization server 106 as a response to the request in S3.3 for display. In response to a press of a login button 904, the Web browser 1021 transmits a log-in request along with a tenant ID 901, client ID 902, and password 903 to the authorization server 106 as user information input by a user and registered with the authorization server in advance.

When the authorization server 106 receives the log-in request, the authorization server 106 verifies the tenant ID, client ID, and password contained in the request with reference to the client information 500. In other words, whether a record matched to the input authentication information is included in the client information 500 or not is determined. If the log-in is succeeded as a result of the verification, the log-in client information can be identified, and the authentication information is returned to the Web browser 1021. The Web browser 1021 adds the authentication information to each request to hold the authenticated state so that each server can identify the log-in user information from the authentication information.

On the other hand, when the authorization server 106 identifies the log-in client information 500 from such authentication information if attached to the authorization setting screen request in S3.3, the authorization server 106 returns a response to the request in S3.3. As the response, an authorization confirmation window 910 including a scope, the printer information, and the client information 500 contained in the authorization setting screen request is returned to the Web browser. FIG. 4B illustrates an example of the authorization confirmation window 910 to be displayed on the Web browser 1021. In this example, a screen is displayed showing a message 911 for confirming the authorization and a client ID, a tenant ID, a IP address of the printer to be authorized, and an authority in association with the scope. The window further displays an OK button 912 for accepting the execution of the authorization and an NG button 913 for denying it.

If the OK button 912 is pressed on the authorization confirmation window 910 to accept the execution of the authorization, the Web browser 1021 in the client terminal 102 transmits an authorization token generation request to the authorization server 106 in S3.4. If the authorization server 106 receives the authorization token generation request, the authorization server 106 refers to the client information 500 to determine whether the scope being a parameter of the authorization token generation request is included in the log-in client information 500 or not. If the scope is included, an authorization token is generated and is registered with the authorization token information 510. If the scope is not included in the client information 500, "ERROR" is returned to the Web browser 1021. The authorization server 106 returns the generated authorization token to the Web browser as a response in S3.4.

In S3.5, the Web browser 1021 transmits the authorization token received from the authorization server 106 along with a representative authorization token information registration request to the authorization server cooperation client 1032 in the printer 103. If the authorization server cooperation client 1032 in the printer 103 receives the representative authorization token information registration request, the authorization server cooperation client 1032 registers the authorization token ID, client ID, and tenant ID in the received authorization token as representative authorization token information 400.

Through this flow, the authorization of the client information 500 registered with the authorization server 106 can be transferred to the printer 103 so that the printer 103 can use the representative authorization token information 400 to access the data conversion server 108 under the authority of the client information 500. With this procedure, an authorization token is acquired by identifying a user who is logging in or who has logged in as a representative client of a cloud service and is registered as representative authorization token information with the printer 103 so that the authorization of the client can be transferred to the printer 103. The printer 103 can execute document printing by using the transferred authorization in the procedure in FIG. 5, which will be described below, for example.

Authenticated Printing

Figure 5:
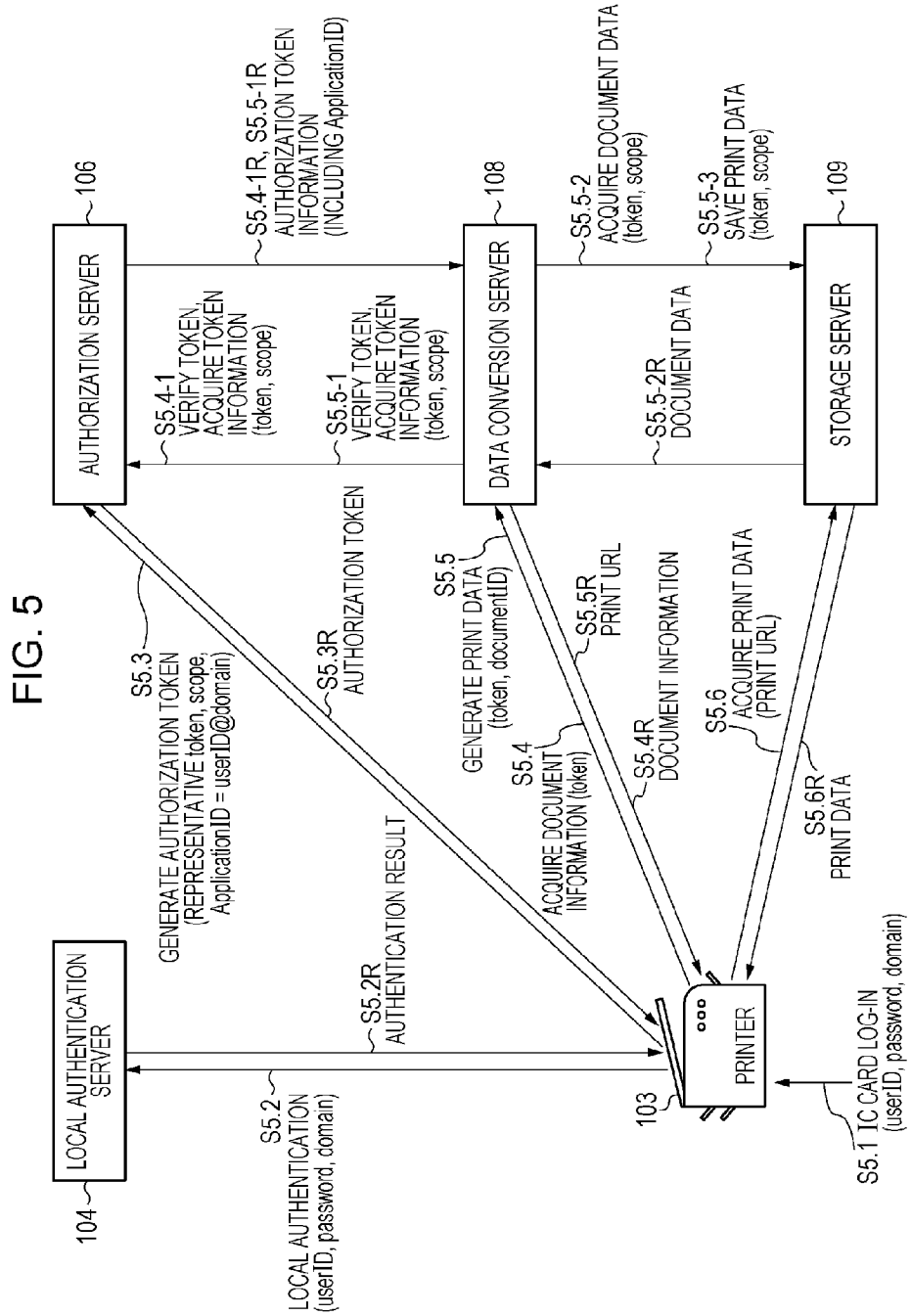
FIG. 5 illustrates an authenticated printing flow.

FIG. 5 illustrates a flow for executing authenticated printing according to this embodiment. It is assumed here that the user authorization setting flow in FIG. 3 has completed, that the printer 103 is authorized by a user managed in the client information 500 in the authorization server 106 and that the representative authorization token information 400 is registered with the printer 103. In the sequence in FIG. 5, the printer 103 is a client of a cloud service, and the printer 103 will also be called a client device hereinafter. Referring to FIG. 5, steps S5.X indicate requests, and steps S5.XR indicate responses to the respective requests in steps S5.X.

In S5.1, if a log-in app in the printer 103 receives local authentication information containing a domain name, a user name, and a password from the IC card reader 242, the log-in app in the printer 103 transmits a user authentication request to the local authentication server 104 in S5.2.

The local authentication server 104 refers to the local authentication information 300, compares it with the local authentication information contained in the request and returns (S5.2R) the result to the printer. If there is a record corresponding to the local authentication information 300, the user is authenticated successfully.

If the authentication result received from the local authentication server 104 is "failure", the printer 103 exits the processing by determining it as an error. If the authenticate result is "success", the log-in app 1031 in the printer 103 returns the local authentication information of the log-in user to the pull-print app 1033. The pull-print app 1033 returns an authorization token acquisition request including the scope and the application ID to the authorization server cooperation client 1032. Here, the pull-print app 1033 determines the value designated as the application ID to be included in an authorization token generation request in accordance with the local authentication cooperation information 430. If the value of the local authentication cooperation mode in the local authentication cooperation information 430 is true, the pull-print app 1033 designates local user information (user name@domain name) as the application ID. If the value of the local authentication cooperation mode is false, a default value is used. According to this embodiment, the default value is a predetermined ID by which the pull-print app 1033 running on the printer 103 can be identified. However, it may be an arbitrary character string, or the application ID may not be designated.

In S5.3, the authorization server cooperation client 1032 in the printer 103 transmits an authorization token generation request including the authorization token, scope, and application ID in the representative authorization token information 400 to the authorization server 106.

Figure 6:
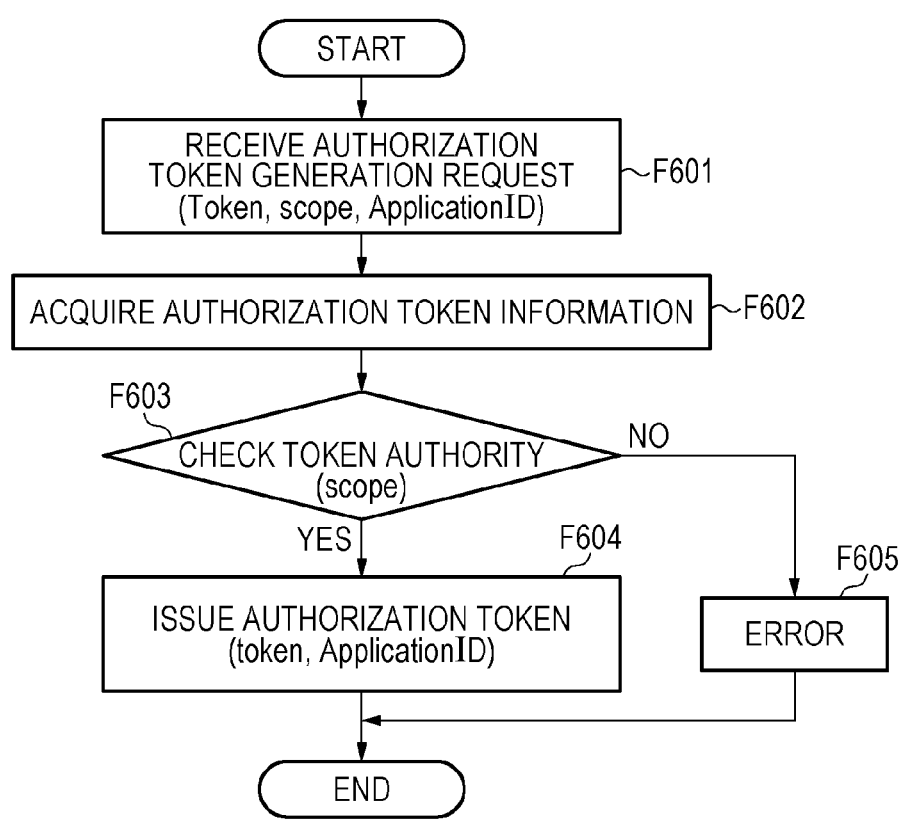
FIG. 6 illustrates a flow for issuing an authorization token.

When the authorization server 106 receives the authorization token generation request from the printer 103, the authorization server 106 issues (S5.3R) an authorization token through an authorization token issuance flow performed by the authorization server 106 as illustrated in FIG. 6, which will be described below, to the printer 103. The authorization server cooperation client 1032 passes the received authorization token to the pull-print app 1033. The pull-print app 1033 holds the authorization token ID and local user information included in the application ID in the representative authorization token information 420 as an authorization token ID 421 and a user name 422, and a domain name 423.

In S5.4, the pull-print app 1033 transmits a document information acquisition request including the authorization token acquired in S5.3 to the data conversion server 108. When the data conversion server 108 receives the document information acquisition request, the data conversion server 108 in S5.4-1 transmits an authorization token verification request to the authorization server 106 through an authorization token verification flow performed by the data conversion server 108 (as illustrated in FIG. 6). If the authorization token is valid, authorization token information 510 corresponding to the authorization token is acquired (S5.4-1R). The authorization token information 510 includes an application ID which is local user information of a user logging in to the printer 103 in S5.1. In this case, the data conversion server 108 uses the user ID determined in S5.4 to extract the corresponding record from the document information 700 and returns (S5.4R) it to the printer 103 as a response to the request in S5.4.

In S5.5, the pull-print app 1033 in the printer 103 refers to the document information 700 acquired in S5.4 and transmits the authorization token and a print data generation request including a document ID to the conversion server 108. When the data conversion server 108 receives the print data generation request, the data conversion server 108 in S5.5-1 transmits an authorization token verification request to the authorization server 106 in the same manner as that in S5.4-1, acquires the authorization token information 510 and identifies a user ID (S5.5-1R). The data conversion server 108 uses the document ID included in the print data generation request and the user ID identified in S5.5-1 to extract the corresponding record from the document information 700. The data conversion server 108 further refers to the document URL in the extracted document information 700 and acquires the corresponding document data file from the storage server 109 in S5.5-2 and S5.5-2R. Finally, the data conversion server 108 converts the document data acquired in S5.5-2 and S5.5-2R to print data, newly issues a data conversion ID corresponding to the print data acquired by the conversion, and registers a record having the data conversion ID with the data conversion information 710. The data conversion server 108 further uploads (S5.5-3) the print data after the conversion to the storage server 109 and registers a URL for accessing the print data with a print URL 714 in the data conversion information 710. The data conversion server 108 returns (S5.5R) the print URL 714 in the converted data information 710 registered newly to the printer 103 as a response to the print data generation request in S5.5.

In S5.6, the pull-print app 1033 in the printer 103 accesses the print URL acquired in response to the print data generation request in S5.5 and S5.5R, acquires (S5.6R) the print data, transfers the acquired print data to the raster controller 237 and the print engine 238 and prints it.

Flow of Issuance of Authorization Token by Authorization Server 106

FIG. 6 illustrates details of a flow of processing for issuing an authorization token when the authorization server 106 receives an authorization token request (S5.3).

In F601, the authorization server 106 receives an authorization token generation request. The authorization server 106 receives a representative authorization token, a scope, and an application ID as parameters in the authorization token generation request.

In F602, the authorization server 106 identifies a record matched to the representative authorization token received in F601 from the authorization token information 510.

In F603, the authorization server 106 determines whether the scope 503 in the client information 500 identified in F602 is matched to the scope received in F601 or not. If they are not matched, "ERROR" is returned (F605).

In F604, the authorization server 106 issues an authorization token ID and registers a record including the client ID, scope, and application ID received in F601 with the authorization token information 510. In the processing in S5.3 according to this embodiment, local authentication information (user name@domain name) is designated as the application ID if the local authentication cooperation mode is set. However, a request from a client not involved in the local authentication cooperation has a null or different value in the application ID.

Flow of Verification of Authorization Token by Data Conversion Server 108

Figure 7:
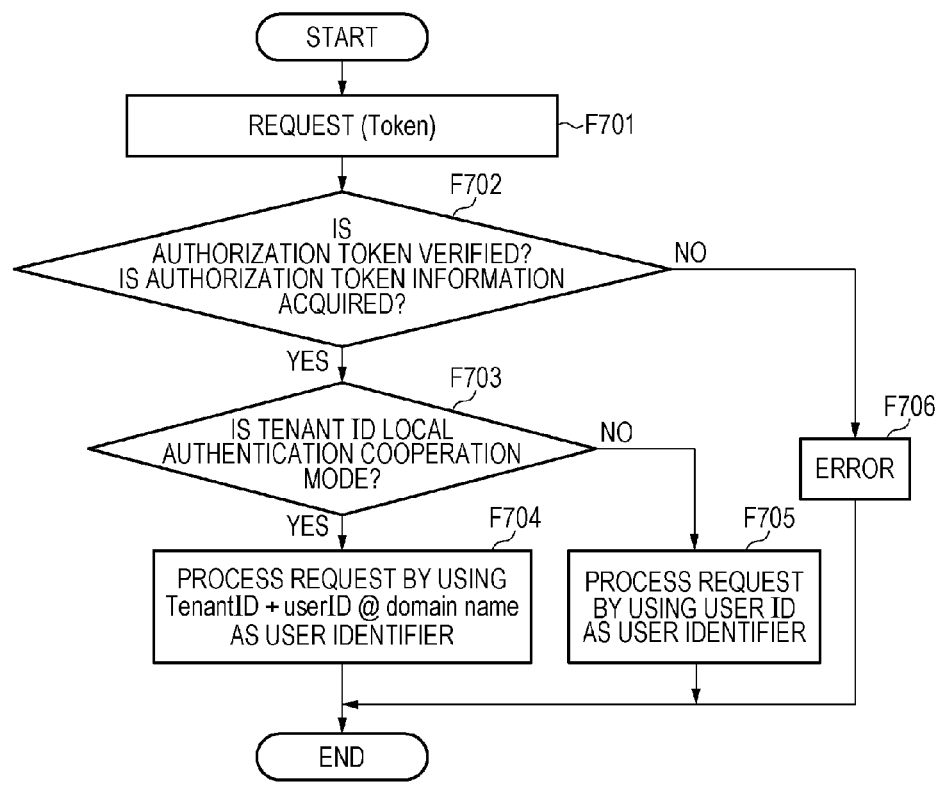
FIG. 7 illustrates a flow for using an authorization token.

FIG. 7 illustrates details of a flow of processing for authorization token verification when the data conversion server 108 receives a request (S5.4, S5.5).

In F701, the data conversion server 108 receives a request. An authorization token is received as a parameter of the request.

In F702, the data conversion server 108 transmits an authorization token verification request to the authorization server 106. If authorization token information is not acquired as a result of the authorization token verification request, "ERROR" is returned (F706).

In F703, the data conversion server 108 identifies a record matched to the tenant ID in the authorization token information from the tenant setting information 720. Then, the data conversion server 108 determines whether the local authentication cooperation mode of the tenant is enabled (true) or not.

If it is determined in F703 that the local authentication cooperation mode of the tenant is enabled, the data conversion server 108 in F704 processes the request by handling the local user information 300 (user name@domain name)

registered with the tenant ID and application ID in the authorization token information as a unique user.

If it is determined in F703 that the local authentication cooperation mode of the tenant is disabled, the data conversion server 108 in F705 processes the request by handling the user ID in the authorization token information 510 as a unique user.

Local user information is associated with an authorization token upon issuance of the authorization token so that the local user information can be acquired from the authorization token information when the authorization token is used and so that the data conversion server 108 can recognize the user of the local authentication server 104 as a unique user. The local user information associated with the authorization token may be processed as identification information describing a unique user in charging processing and totalization processing in the data conversion server 108, for example, so that the local user information associated with the authorization token can be used in cooperation with the local authentication server 104. This can eliminate the necessity for ID provisioning between the local authentication security domain 110 and the business form service security domain 111, which can reduce the operation load. The business server 105 uses one client to issue an authorization token, but use of the issued authorization token is limited by the local authentication information. Thus, information regarding other users cannot be accessed by using the authorization token. Therefore, the authentication cooperation can be implemented securely.

The enable/disable of the local authentication cooperation mode may be defined as a setting for each tenant so that a specific tenant in a multitenant mode can only enable the local authentication cooperation and that client's needs can be met flexibly in authentication and authorization processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2015-239750, filed Dec. 8, 2015, which is hereby incorporated by reference herein in its entirety.

What is claimed is:

1. An authorization server comprising:

at least one processor; and at least one memory having instructions stored thereon that, when executed by the at least one processor, controls the processor act as:

a unit configured to receive an authorization token generation request along with a representative authorization token information and a local user information from a client device, the client device receiving transfer of an authority for using an application server based on an authorization operation performed by a user, the client device registering a first authorization token issued based on the transfer as representative authorization token information, wherein the local user information is user information used in a local authentication process performed by a local authentication server, which is connected to the client device via a local network, and the unit receives the authorization token generation request after the user is locally authenticated by the local authentication server;

a unit configured to, in a case, where the client device is authenticated successfully on the basis of the representative authorization token information received along with the authorization token generation request, respond with a second authorization token to the client device and generate and store authorization token information by associating the local user information received along with the authorization token generation request with the second authorization token;

a determination unit configured to receive an authorization token verification request including the second authorization token from the application server that received a processing request along with the second authorization token from the client device, and, in a case that the authorization token is verified successfully on the basis of the received second authorization token and the authorization token information, determine whether a local authentication cooperation mode of a tenant identified by the second authorization token is enabled or not; and a responding unit configured to, if determined by the determination unit that the local authentication cooperation mode is enabled, respond with the local user information included in the authorization token information and tenant information included in the authorization token information to the application server, and, if determined by the determination unit that the local authentication cooperation mode is not enabled, respond with another user ID included in the authorization token information, wherein the application server processes a request from the client device based on the received local user information.

2. The authorization server according to claim 1, wherein the representative authorization token information includes identification information of the client and identification information of a tenant of the representative client; and wherein the responding unit responds, as a part of the authorization token information, the identification information of the tenant of the client device.

3. The authorization server according to claim 1, wherein the local user information includes information describing a domain accessible by a user authenticated by a local authentication server and user identification information in the domain.

4. The authorization server according to claim 3,
wherein the authorization token verification request is received from an application server having received a processing request from the client device along with the second authorization token; and
wherein the local user information is used by the application server for identifying a user being a requestor of the processing request.

5. An authentication cooperation system comprising an authorization server, an application server, and a client device, wherein the authorization server comprises:
at least one processor; and
at least one memory having instructions stored thereon that, when executed by the at least one processor, controls the processor act as:
a unit configured to receive an authorization token generation request along with a representative authorization token information and a local user information from a client device, the client device receiving transfer of an authority for using an application server based on an authorization operation performed by a user, the client device registering a first authorization token issued based on the transfer as representative authorization token information,
wherein the local user information is user information used in a local authentication process performed by a local authentication server, which is connected to the client device via a local network, and the unit receives the authorization token generation request after the user is locally authenticated by the local authentication server;
a unit configured to, in a case, where the client device is authenticated successfully on the basis of the representative authorization token information received along with the authorization token generation request, respond with a second authorization token to the client device and generate and store authorization token information by associating the local user information received along with the authorization token generation request with the second authorization token;
a determination unit configured to receive an authorization token verification request including the second authorization token from the application server that received a processing request along with the second authorization token from the client device, and, in a case that the authorization token is verified successfully on the basis of the received second authorization token and the authorization token information, determine whether a local authentication cooperation mode of a tenant identified by the second authorization token is enabled or not; and
a responding unit configured to, if determined by the determination unit that the local authentication cooperation mode is enabled, respond with the local user information included in the authorization token information and tenant information included in the authorization token information to the application server, and, if determined by the determination unit that the local authentication cooperation mode is not enabled, respond with another user ID included in the authorization token information,
wherein the application server processes a request from the client device based on the received local user information
wherein the client device comprises:
a storing unit configured to store the first authorization token as representative authorization token information, the first authorization token being issued based on transfer of an authority for using the application server based on the authorization operation performed by the user;
a transmitting unit configured to transmit an authorization token generation request along with local user information of a log-in user and the representative authorization token information to the authorization server; and
wherein, in the case that a second authorization token is received along with the authorization token generation request, the transmitting unit is configured to transmit a request for processing along with the second authorization token to the application server; and
wherein the application server comprises:
a transmitting unit configured to transmit the authorization token verification request to the authorization server when the application server receives a processing request along with the second authorization token from the client device and receive the authorization token information including the local user information associated with the second authorization token as a response as a result of a success of the authorization token verification request; and
a processing unit configured to process the processing request for the user described in the local user information or for the client device.

6. The authentication cooperation system according to claim 5,
wherein the representative authorization token information includes identification information of the client device and identification information of a tenant of the client device;
the authorization server is configured to respond, as a part of the authorization token information, with the identification information of the tenant of the client device requesting to generate the authorization token verified successfully; and
wherein the application server is configured to process the processing request for a user described in the local user information or for the client device in the case that the local authentication cooperation mode set based on the identification information of the tenant is enabled.

7. A non-transitory computer readable storage medium storing instructions that, when executed by at least one processor of a device, causes the device to act as the authorization server, the authorization server:
receives an authorization token generation request along with a representative authorization token information and a local user information from a client device, the client device receiving transfer of an authority for using an application server based on an authorization operation performed by a user, the client device registering a first authorization token issued based on the transfer as representative authorization token information,
wherein the local user information is user information used in a local authentication process performed by a local authentication server, which is connected to the client device via a local network, and the unit receives the authorization token generation request after the user is locally authenticated by the local authentication server;

configures, in a case, where the client device is authenticated successfully on the basis of the representative authorization token information received along with the authorization token generation request, respond with a second authorization token to the client device and generate and store authorization token information by associating the local user information received along with the authorization token generation request with the second authorization token;

receive an authorization token verification request including the second authorization token from the application server that received a processing request along with the second authorization token from the client device, and, in a case that the authorization token is verified successfully on the basis of the received second authorization token and the authorization token information, determine whether a local authentication cooperation mode of a tenant identified by the second authorization token is enabled or not; and if it is determined that the local authentication cooperation mode is enabled, respond with the local user information included in the authorization token information and the tenant information included in the authorization token information to the application server, and, if it is determined that the local authentication cooperation mode is not enabled, respond with another user ID included in the authorization token information, wherein the application server processes a request from the client device based on the received local user information.

* * * * *